No. 655,118.  
Patented July 31, 1900.
J. C. REIS.  
NUT LOCK.  
(Application filed Dec. 7, 1899.)
(No Model.)
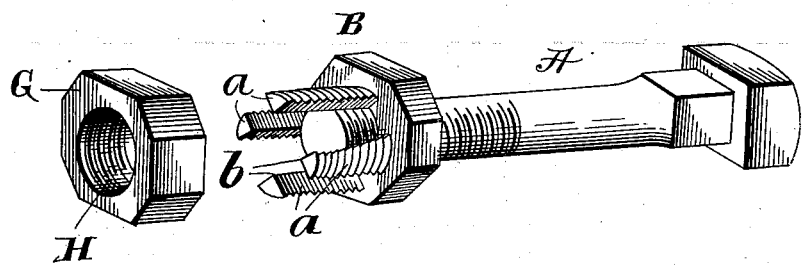
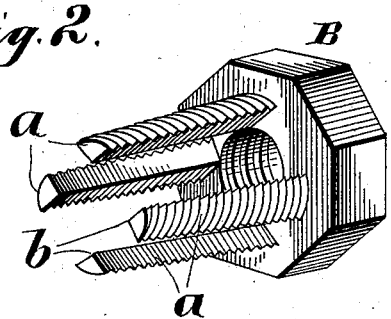
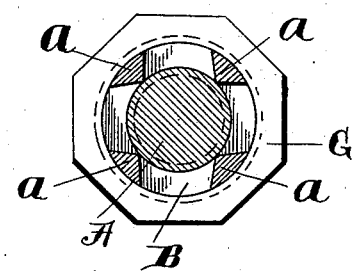
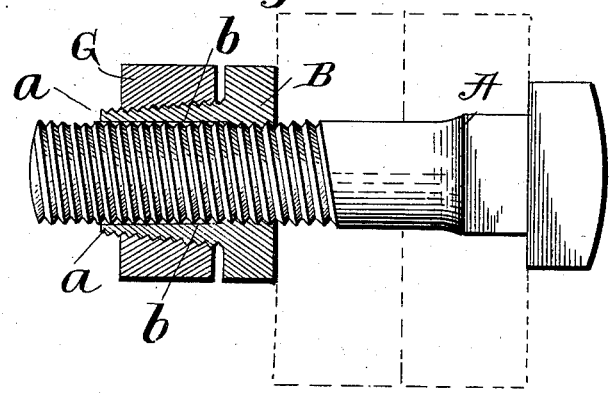
Witnesses  
Geo. E. Frech  
Chas. R. Wright Jr.
Inventor  
John C. Reis,  
by A. S. Pattison  
Attorney.

UNITED STATES PATENT OFFICE.

JOHN C. REIS, OF WEST UNION, OHIO.

NUT-LOCK.

SPECIFICATION forming part of Letters Patent No. 655,118, dated July 31, 1900.

Application filed December 7, 1899. Serial No. 739,525. (No model.)

*To all whom it may concern:*

Be it known that I, JOHN C. REIS, a citizen of the United States, residing at West Union, in the county of Adams and State of Ohio, have invented new and useful Improvements in Nut-Locks, of which the following is a specification.

My invention relates to improvements in nut-locks, and pertains to a nut-lock in which two nuts are used, one nut provided with projecting arms adapted to receive a clamping-nut, all of which will be fully described hereinafter, and particularly pointed out in the claims.

In the accompanying drawings, Figure 1 is a perspective view of a nut-lock embodying my invention. Fig. 2 is a detached perspective view of the nut which is provided with the locking-arms. Fig. 3 is a longitudinal vertical section of a nut-lock embodying my invention, all of the parts being shown in their locked position. Fig. 4 is a cross-sectional view.

Referring now to the drawings, A represents a screw-bolt of the usual construction, and B a nut adapted to be placed thereon for the purpose of clamping the object to be held between the inner face of the said nut and the inner face of the head of the bolt, as is usual in such devices.

The nut B is of a peculiar form, wherein it is provided with a plurality of outwardly-projecting arms $a$. The outer faces of these arms are screw-threaded and are made to taper outward—that is to say, the arms gradually grow thicker inwardly from their outer ends for a purpose to be explained hereinafter. The inner sides or faces of these arms are made wedge-shaped to provide longitudinally-extending biting edges $b$, which are adapted to engage the screw-threads of the bolt A when they are forced inward in contact therewith. These arms are forced inward in contact with the screw-threads of the bolt for the purpose of locking the nut B by means of a locking-nut G. This locking-nut G has a transverse opening H, which is larger in diameter than the screw-threaded opening in the nut B, and consequently considerably larger than the bolt A, and is of sufficient diameter to have its inner end freely pass over and engage the external screw-threaded portion of the locking-arms of the nut G. The opening in this nut G is preferably made largest at its inner end, as illustrated—that is, tapers outwardly—whereby, in combination with the outwardly-tapering outer surfaces of the locking-arms, the inner wedge-shaped biting edges of the locking-arms are forced inward in contact with the screw-threads of the bolt when the nut is turned thereon, as shown in Fig. 3.

In operation the nut B is screwed upon the bolt A until the object it is desired to clamp is firmly held, when the nut G is then screwed upon the locking-arms, which forces them inward in contact with the screw-threads of the bolt A, causing their longitudinal biting edges to engage the threads of the bolt and to thereby firmly hold the nut B against any relative rotation upon the bolt A and providing a reliable and firm lock for the nut B.

Having thus described my invention, what I claim, and desire to secure by Letters Patent, is—

1. A nut-lock comprising a nut provided with a plurality of outwardly-projecting locking-arms having inner longitudinally-extending biting edges adapted to engage the threads upon a bolt, and a locking member embracing the said locking-arms and forcing them inward in contact with the threads of the bolt, substantially as described.

2. A nut-lock comprising a bolt, a nut adapted to screw upon the said bolt, said nut provided with outwardly - projecting locking-arms, said locking-arms having screw-threaded external portions and their inner faces tapered to a biting edge for engaging the threads of the bolt, and a locking-nut having a screw-threaded opening adapted to engage the external screw-threaded portions of the locking-arms and forcing them in engagement with the threads of the bolt, substantially as described.

3. A nut-lock comprising a bolt, a nut adapted to be screwed thereon, said nut having outwardly-projecting locking-arms with external screw-threaded portions, said locking-arms being wedge-shaped in cross-section constituting at their inner faces longitudinally-extending biting edges, and a locking-nut adapted to receive and screw upon the external screw-threaded surfaces of the locking-arms and force them in contact with the threads of the bolt, substantially as described.

In testimony whereof I have hereunto set my hand in the presence of two subscribing witnesses.

JOHN C. REIS.

Witnesses:
P. S. RHOADS,
GEO. W. PETTIT.